(12) United States Patent
Shimode et al.

(10) Patent No.: US 6,885,914 B2
(45) Date of Patent: Apr. 26, 2005

(54) GREEN POWER SUPPLY SYSTEM AND GREEN POWER SUPPLY METHOD

(75) Inventors: Shinichi Shimode, Ishioka (JP); Chihiro Fukui, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/361,641

(22) Filed: Feb. 11, 2003

(65) Prior Publication Data

US 2003/0220720 A1 Nov. 27, 2003

Related U.S. Application Data

(63) Continuation of application No. 10/161,633, filed on Jun. 5, 2002, now abandoned, which is a continuation of application No. 09/962,256, filed on Sep. 26, 2001, now abandoned.

(30) Foreign Application Priority Data

Sep. 26, 2000 (JP) .................................. 2000-297054

(51) Int. Cl.[7] .............................. H02J 3/00; G06F 17/60
(52) U.S. Cl. ........................ 700/288; 700/286; 700/291; 700/295; 700/296
(58) Field of Search ............................... 700/288, 286, 700/291, 295, 296

(56) References Cited

U.S. PATENT DOCUMENTS 6,038,540 A * 3/2000 Krist et al. ..................... 705/8
6,080,927 A * 6/2000 Johnson ....................... 136/248
6,512,966 B1 * 1/2003 Lof et al. ...................... 700/291
6,647,717 B1 * 11/2003 Zaslavsky et al. ............ 60/398

FOREIGN PATENT DOCUMENTS

JP 2000-78747 3/2000
JP 2000-297054 9/2000

OTHER PUBLICATIONS

"The changing role of Environmental Engineering: How Green is Green" –Pranee Pantumsinchai, PE. President, Environmental Engineering Association of Thailand.*
"Green Power Switch" –Tenessee Vally Authority website. http://www.tva.gov/greenpowerswitch/□□.*

* cited by examiner

Primary Examiner—Leo Picard
Assistant Examiner—Michael D. Masinick
(74) Attorney, Agent, or Firm—Antonelli, Terry, Stout & Kraus, LLP

(57) ABSTRACT

To permit a customer to reduce environmental load without reducing their electric power, a green power supply system is provided which includes a power supply request acceptance part which accepts from a customer a request to supply power having small environmental loads to the customer, a storage-of-power-supply-content requesting part which stores the state of power supply from each power generation facility, a green degree calculating part which determines the proportion of power which is supplied from the power generation facility having the small environmental loads, in power supplied to the customer, and a customer-directed green-degree notification part which notifies the customer of the degree of environmental load.

27 Claims, 9 Drawing Sheets

FIG. 8(a)

| | GREEN DEGREE | POWER | GREEN DEGREE* POWER |
|---|---|---|---|
| THERMAL | 1 | 4000 | 4000 |
| ATOMIC | 5 | 1500 | 7500 |
| LARGE SCALE HYDROELECTRIC | 10 | 2000 | 20000 |
| SMALL SCALE HYDROELECTRIC | 20 | 500 | 10000 |
| GEOTHERMAL | 100 | 100 | 10000 |
| WIND | 100 | 100 | 10000 |
| BIOMASS | 80 | 100 | 8000 |
| SUM | | 8300 | 69500 |

GENERATED POWER

GREEN DEGREE* GENERATED POWER

GREEN POWER SUPPLY SYSTEM AND GREEN POWER SUPPLY METHOD

This is a continuation of application Ser. No. 10/161,633 filed Jun. 5, 2002, now abandoned, which was a continuation of application Ser. No. 09/962,256, filed Sep. 26, 2001, now abandoned, the entire disclosures of which are hereby incorporated by reference.

BACKGROUND OF THE INVENTION

1. Field of the Invention

The present invention relates to a power supply system and, more particularly, to a system and method which enable customers to select different types of power suppliers.

2. Background Art

A related art system which pertains to supplying power to customers on the basis of the conditions desired by the customers is described in Japanese Laid-Open No. 78747/2000, which is entitled "POWER COMPANY SELECTING METHOD AND SELECTION SUPPORT SYSTEM".

This related art pertains to the case in which different power companies have different charge systems, and enables a customer to select different contract conditions from each power company according to the conditions desired by the customer. It also presents a combination of the selected contract conditions to the customer.

However, this related art only provides customers with a selection method which merely takes the price of power into account. Electric energy is indispensable to the development of industries and human life, and in particular, the energy required to generate electricity is ideally generated from sources which are essentially inexhaustible and as friendly as possible to the environment.

Examples of such environmentally friendly energy are sunlight, wind power, small-scale water power using no dam, biomass (biological resources) such as wood chips, straw, excretions of livestock, geothermal heat transmitted from magma lying deeply beneath the earth's surface, waste heat utilization at factories or the like, and waste such as burnt refuse.

On the other hand, fossil fuels, such as petroleum, coal and natural gas, and uranium are exhaustible resources which will be completely consumed in the future. In addition, burning fossil fuels produce carbon dioxide (CO2) which seems to be the cause of global warming. Nuclear energy leaves radioactive wastes which are required to be treated with high reliability. Large-scale water power generation needs to build dams which are liable to destroy their surrounding ecological systems.

The primary source of the above-described biomass is wood. Burning wood produces $CO_2$, but living wood absorbs $CO_2$ during photosynthesis. If trees are planted in place of burnt trees so as to maintain the area of a forest, it is possible to maintain the proportion of $CO_2$ in the atmosphere. Accordingly, wood is a so-called green power generation energy which does not cause the problems of global environmental loads and the exhaustion of resources.

As described above, even the case of generating the same amount of power greatly differs in its influence on the environment and in the extent of exhaustion of global resources according to the kind of energy required for the power generation.

Customers have heretofore been unable to know the extent of the influences of powers supplied to the customers on global environmental loads, i.e., the amount of emission of $CO_2$ which is based on the difference between the kinds of energy sources required for power generation, as well as the extent of exhaustion of energy sources. In other words, customers' attempts at reducing global environmental loads have so far been limited to only the method of reducing electric power usage through energy saving, and customers have had few specific choices as to how they can actually promote the conservation of the beautiful earth.

SUMMARY OF THE INVENTION

The present invention solves the above-described problems and provides a power supply system and a power supply method both of which enable customers to consume power and maintain economic activities while taking into account environmental loads and the exhaustion of resources.

The present invention provides an arrangement which includes: a power supply request acceptance part which accepts from a customer a request for a power generation facility to supply power to the customer, the power generation facility using a power generation energy which is small in global environmental load and does not lead to serious exhaustion of resources; a storage-of-power-supply-content requesting part which stores the state of power supply from each power generation facility; a green degree calculating part which determines the proportion of power which is, in response to the request, supplied from the power generation facility using a power generation energy which is small in global environmental load and does not lead to serious exhaustion of resources, in power supplied to the customer according to the state of power supply from each power generation facility; and a green-degree notification part which notifies the customer or a third party of the proportion of the power which is supplied from the power generation facility providing a power generation energy which is small in global environmental load and which does not lead to serious exhaustion of resources, in the power used by the customer.

BRIEF DESCRIPTION OF THE DRAWINGS

The present invention will become more readily appreciated and understood from the following detailed description of preferred embodiments of the present invention when taken in conjunction with the accompanying drawings, in which:

FIG. 8(a) shows a table listing a plurality of power generating facilities using different energy sources, with assigned "green degrees";

DETAILED DESCRIPTION OF THE INVENTION

Figure 1:
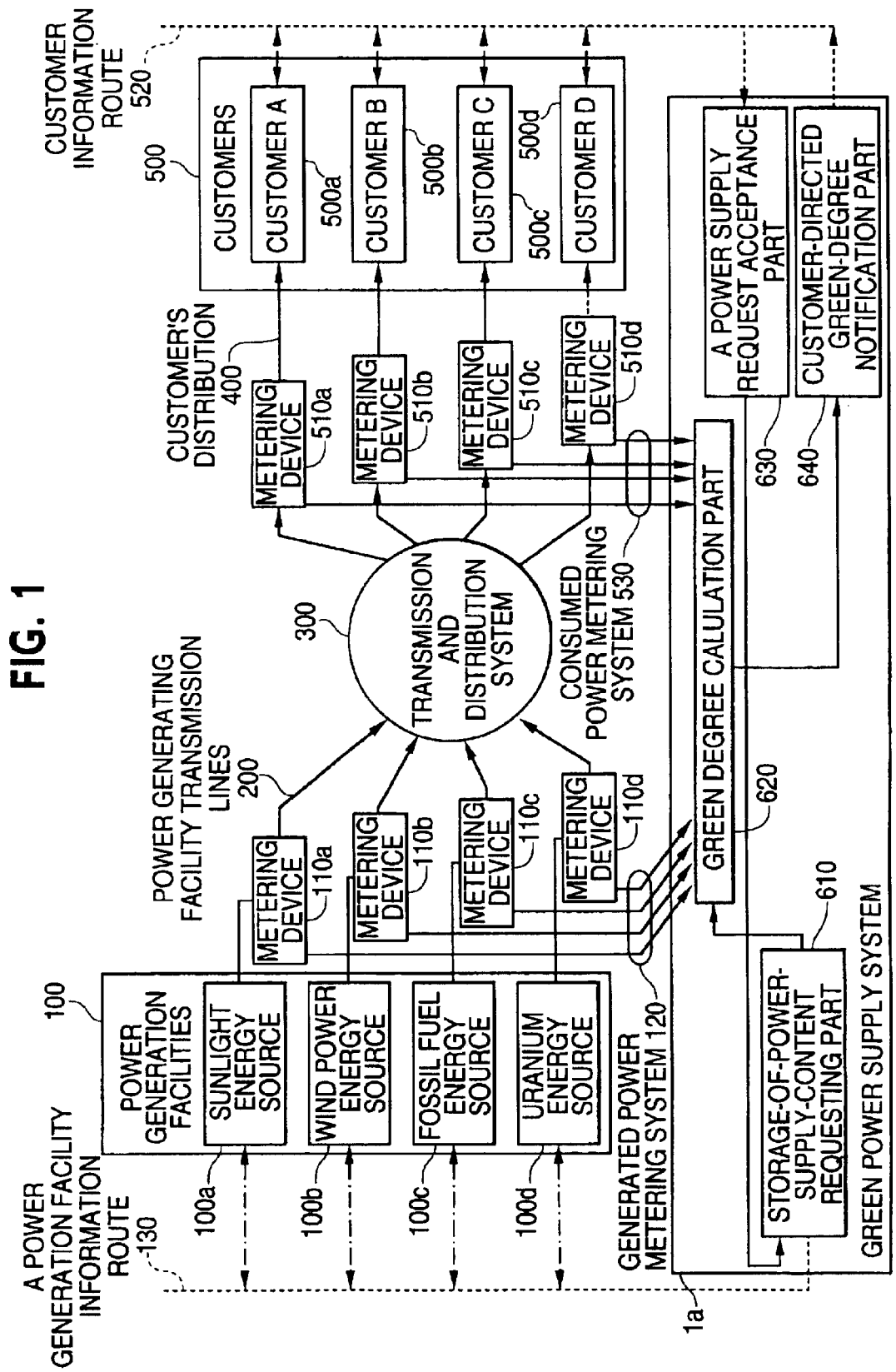
FIG. 1 is an explanatory view of a green power supply system which shows the connection of such a system to both power generation facilities and customers.

Preferred embodiments of a green power supply system and a green power supply method according to the present invention will be described below in detail with reference to the drawings One embodiment of the present invention will be described below with reference to FIGS. 1 and 2. Representative examples of power generation energy sources to be used in power generation facilities are sunlight, wind power, tidal power, small-scale water power using no dam, biomass (biological resources), geothermal heat, waste heat utilization, waste such as burnt refuse, fossil fuels such as petroleum, coal and natural gas, and uranium. These examples have different influences on global environmental loads as well as different potentials for preventing the exhaustion of resources.

Reference numerals 100a, 100b, 100c and 100d denote power generation facilities which respectively use sunlight, wind power, fossil fuel and uranium fuel which are representative examples of power generation energy sources to be used in power generation facilities 100. Energy sources to be used in the present invention need not necessarily be limited to these fuels.

Generated power is transmitted from the respective power generation facilities 100 to a transmission and distribution system 300 through power generation facility transmission lines 200, and passes through the transmission and distribution system 300. Then, the generated power is transmitted to customers A to D, i.e., 500a, 500b, 500c and 500d through customer's distribution lines 400, respectively. The number of customers is not particularly limited to the above-described example, although the present system is designed for use with a plurality of customers.

In FIG. 1, for the sake of simplicity, only the transmission line connected between the transmission and distribution system 300 and the power generation facility 100a and the distribution line connected between the transmission and distribution system 300 and the customer 500a are representatively denoted by reference numerals 200 and 400, respectively, but there actually are provided individual transmission lines and distribution lines, as shown.

There are also provided metering devices 110a to 110d capable of metering the electric powers generated by the respective power generation facilities 100a to 100d and metering devices 510a to 510d capable of metering the electric power consumed by the respective customers 500a to 500d. A generated power metering system 120 is provided for communicating information from the power generation facilities 100a to 100d, while a consumed power metering system 530 is provided for communicating information from the customers 500a to 500d. The communication methods for the generated power metering system 120 and the consumed power metering system 530 are not particularly limited to the above-described example, and may be wired or wireless, or may make use of leased circuits or Internet lines or any other method that enables communication of information.

As shown in FIG. 1, a green power supply system 1a according to the present invention includes a power supply request acceptance part 630, a storage-of-power-supply-content requesting part 610, a green degree calculation part 620, and a customer-directed green-degree notification part 640.

Figure 2:
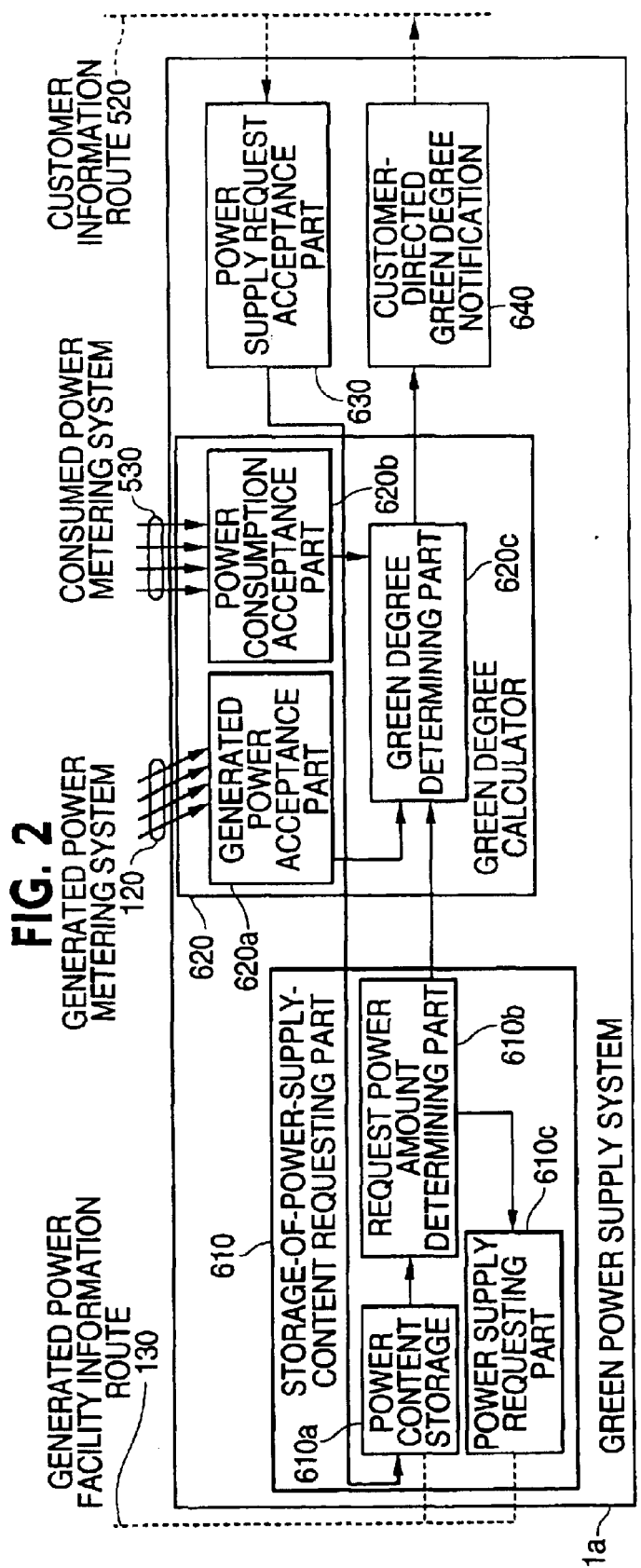
FIG. 2 is a detailed explanatory view of a first embodiment of a green power supply system in accordance with the present invention.

As shown in FIG. 2, the storage-of-power-supply-content requesting part 610 is made of a power content storage part 610a, a request power amount determining part 610b and a power supply requesting part 610c.

The green degree calculation part 620 has a generated power acceptance part 620a connected to the generated power metering system 120, and a power consumption acceptance part 620b connected to the consumed power metering system 530. A green degree determining part 620c is connected to each of the generated power acceptance part 620a and the power consumption acceptance part 620b, and serves to determine the electric power generated by each of the power generation facilities 100 and the power consumption used by each of the customers 500.

Each of the customers 500a to 500d can request the green power supply system 1a of the first embodiment to selectively supply power from the power generation facilities 100 in terms of their influences on global environmental loads for each power generation energy source. The power supply request is accepted by the power supply request acceptance part 630 via a customer information route 520.

In the meantime, the power supply contents of the respective power generation facilities 100a to 100d that are transmitted via a power generation facility information route 130 are always stored in a power content storage part 610a of the storage-of-power-supply-content requesting part 610 together with the contents of power supply requests from the customers. The request power amount determining part 610b compares the power supply contents and the contents of power supply requests which are stored in the power content storage part 610a, and determines the electric power to be supplied to the respective power generation facility transmission lines 200, so that the difference between the supply and demand of power is consistently kept in a predetermined range. On the basis of the decision of the request power amount determining part 610b, the power supply requesting part 610c successively requests each of the power generation facilities 100a to 100d to generate power.

The mutual communication of information between each of power generation facilities 100a to 100d and the green power supply system 1a is carried out via the power generation facility information route 130. The communication method for the power generation facility information route 130 is not limited to a particular method such as a wired or wireless method or the utilization of leased circuits or Internet lines.

The amounts of electric power which pass through the respective power generation facility transmission lines 200 are metered by the respective metering devices 110a to 110d, while the amounts of electric power which pass through the customer's distribution lines 400 are metered by the respective metering devices 510a to 510d. The amounts of electric, power metered by the respective metering devices 110a to 110d are accepted by the generated power acceptance part 620a, and the electric powers metered by the respective metering devices 510a to 510d are accepted by the power consumption acceptance part 620b.

The green degree determining part 620c calculates a green degree relative to the power supplied and to be supplied to the respective customers, on the basis of the electric power transmitted to the green degree calculation part 620 and output information transmitted via the power generation facility information route 130 and outputted from the storage-of-power-supply-content requesting part 610, as well as customer information.

If the output information from the storage-of-power-supply-content requesting part 610 contains the detailed kinds of power generation energy sources for the respective power generation facilities, for example, if the power generation facilities utilize fossil fuels, the composition or the like of a material which is the cause of the environmental load is useful in determining the green degree.

The term "green degree", as used in the present description, denotes an index, or a scale, representative of influences to be exerted on environmental loads and the exhaustion of resources on the basis of the proportion of power generated from a power generation facility which is small in global environmental load.

Thus, a green degree is a respectively predetermined coefficient assigned to a given power generating facility based on the environmental impact of the energy source used by the power generating facility, compared with environmental impact and the proportion of total power generated by another power generation facility which is small in terms of global environmental load. With respect to the scale of the green degree, it is preferably considered on the basis of the influence of a particular facility on the environment around that particular facility.

Figure 8B:
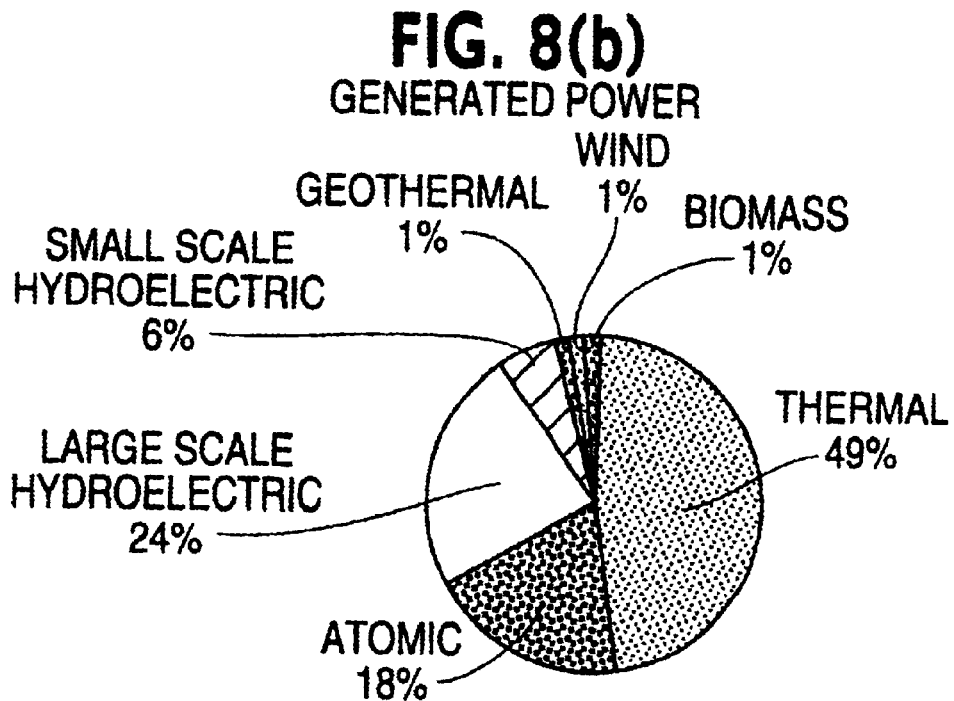
FIG. 8(b) is a graph showing the percentage of power generated by the listed facilities based on their respective energy sources.
Figure 8C:
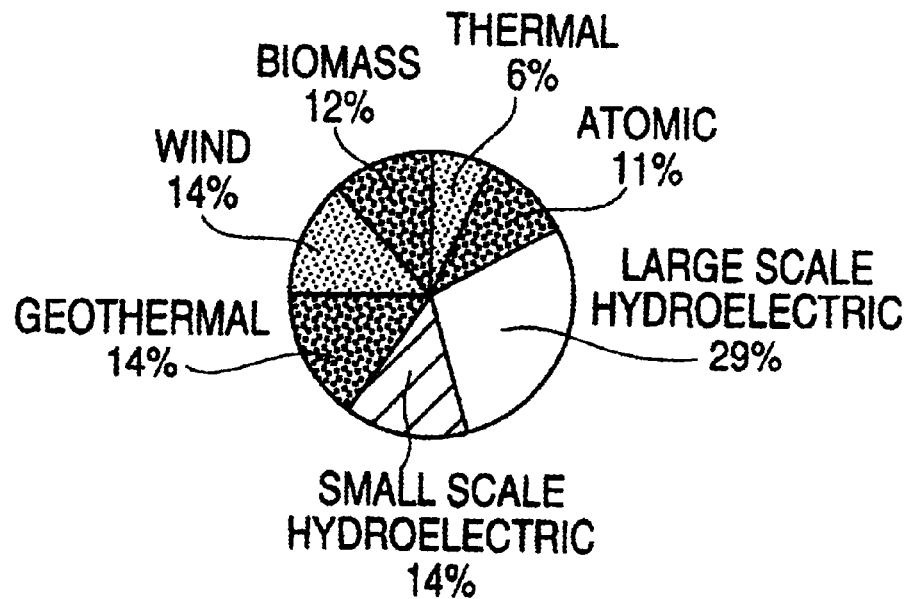
FIG. 8(c) is a graph showing the relative percentage of each facility in terms of the value of the green degree for each facility multiplied by its generated power.

An example of the relationship of the green degree of a given facility to the proportion of power generated by the facility relative to total generated power of a number of facilities is provided in FIGS. 8(*a*)–8(*c*). FIG. 8(*a*) is a table listing a plurality of power generating facilities using different energy sources, the assigned "green degrees", the power each facility is capable of generating and a value of the green degree multiplied by the generated power (i.e., weighted green degree), which can provide a more useful value simply the green degree itself. FIG. 8(*b*) is a graph showing the percentage of power generated by the listed facilities based on their respective energy sources. FIG. 8(*c*) is a graph showing the relative percentage of each facility in terms of the value of the green degree for each facility multiplied by its generated power.

In studying FIGS. 8(*a*)–8(*c*), it can be seen that the green degree assigned to each of the respective power sources is a predetermined coefficient representative of the environmental impact of each of the sources (in terms of global environmental load and exhaustion of resources) without regard to the particular effectiveness of the given power source in terms of actually generated power. Thus, wind has a much higher green degree of 100 compared with conventional thermal sources which have a very low green degree of 1. However, wind is much less effective as a source of electric power. Accordingly, the actual "green degree" to be provided to customers, and to third parties, is preferably adjusted for the effectiveness of any given energy source in generating electric power.

To this end, the last column of FIG. 8(*a*) provides a value of "green degree*power" or, in other words, a weighted green degree that gives a more realistic view to consumers and third parties. These values give a relative figure that includes not only the absolute impact on environment, but also the relative effectiveness of a given source in meeting the essential need for electric power. FIG. 8(*c*) shows percentage relationships that can be generated from the product of "green degree*power". These percentage values can then be used to provide more useful "green degrees" to customers and third parties than the green degree by itself so that evaluations can be made, as will be discussed later in this description.

What a customer, or a third party, is preferably informed of as a green degree is "an electric power green degree" that is calculated based mainly on supplied electric power transferred from each power generating facility. Such an electric power green degree cannot be calculated as a linear function. In a given moment, an absolute value of a sum total of multiplying respective green degrees by the generated power from a plurality of facilities will be fixed. This absolute value, however, is not necessarily adequate to calculate each electric power green degree is response to each request from customers.

To calculate an electric power green degree for each customer requested power supply including electric power generated at a facility having a small environmental load, it is preferable to compare a "requested" value of a sum total of multiplying requested green degrees from each customer for consuming electric power with a "real" value of a sum total of multiplying green degrees by generated power from each generating facility, and adjust each electric power green degree in response to requested electric power green degree to be even for each green degree. Such an adjustment uses statistical calculations.

In summary, it can be seen that the term "green degree" is a relative term that can have different meanings or values depending on the exact factors that one decides to use. In its simplest form, "green degree" can be a simple assigned value, such as shown in the second column in FIG. 8(*a*). This green degree is simply a predetermined coefficient to indicate the environmental impact of any given power source relative to other power sources. However, a more sophisticated form of green degree can be produced based on the overall effectiveness of any given power source relative to other power sources in terms of producing electric power. In the present application, it is not intended to limit the term "green degree" to a particular calculation for determining the green degree. Instead, the present invention is directed to taking the values of green degree calculated in a consistent manner between a plurality of power sources and using these calculated values of green degree to establish a relative rating between power generation facilities and customers using these power generation facilities, to enable evaluations to be made both by the customers and third parties in accordance with discussions set forth later in the present specification. It is also noted that, although FIG. 8(*a*) shows only positive values for green degree, it is possible to assign negative values, if desired.

Then, the customer-directed green-degree notification part 640 notifies each of the customers 500*a* to 500*d* of their own green degree. This notification may contain not only the green degree of the power consumed by each of the customers 500*a* to 500*d* but also the contents of a customer's request, the contents of a customer's schedule and the contents of customer's past results. This notification is carried out via the customer information route 520.

In this embodiment, each of the customers 500*a* to 500*d* can select a power source which takes into account, in addition to the necessary electric power, environmental loads to be required for power generation and influences on the exhaustion of resources, i.e., the power generation facilities or a green degree which is determined according to each of the power generation facilities or the power generation facility. Moreover, since each of the customers 500a to 500d can know, in addition to its own consumed electric power, the green degree of the power, it is possible to realize the customer's contribution to the conservation of the beautiful earth. In addition, if the green power supply system according to the present invention is spread over the whole world, it is possible to yield the advantages of global environmental conservation and prevention of the exhaustion of resources.

Figure 3:
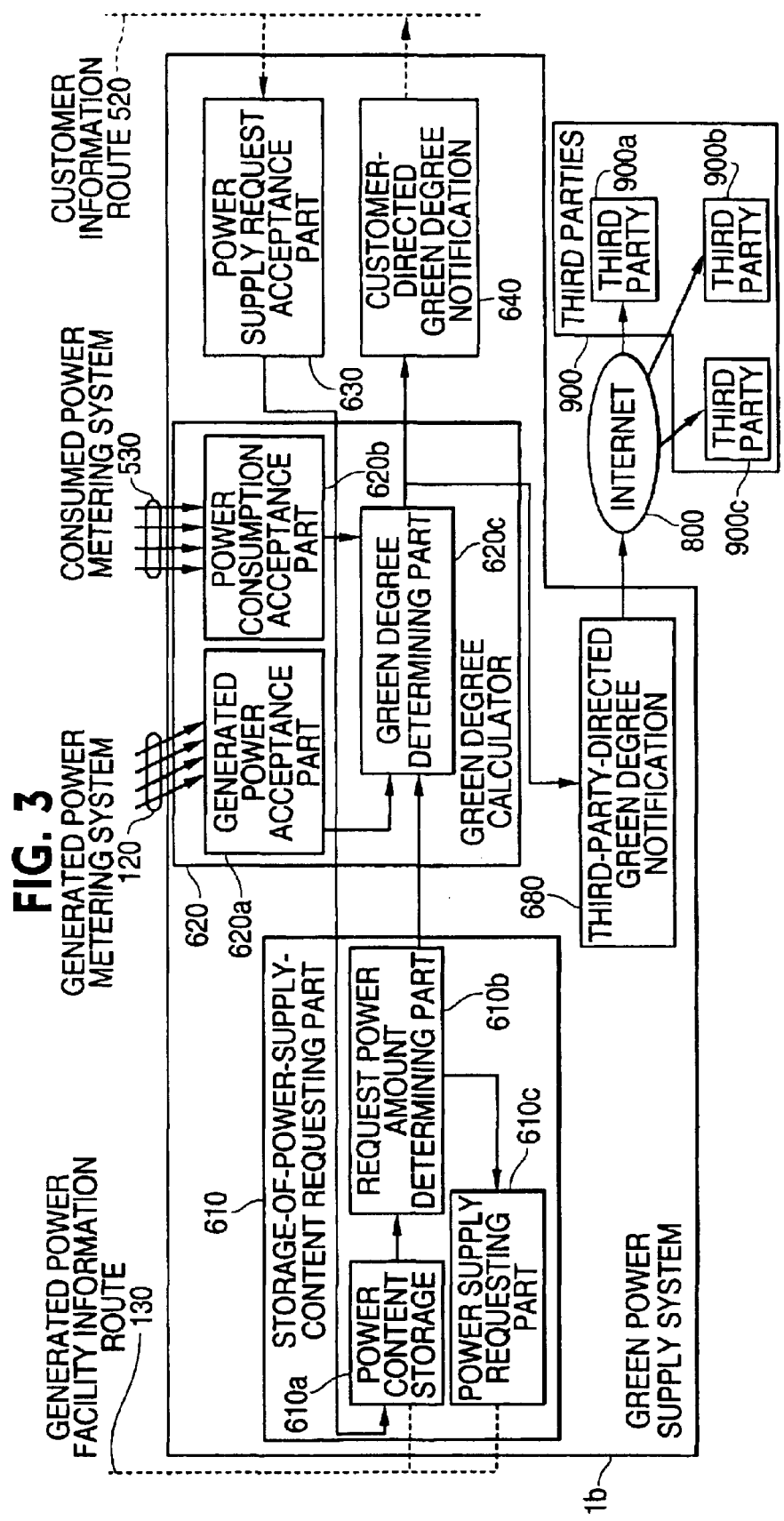
FIG. 3 is an explanatory view of a system, showing another embodiment of a green power supply system of the present invention.

A green power supply system 1b which is another embodiment of the present invention will be described below with reference to FIG. 3. The green degree determined by the green degree determining part 620c in the green degree calculation part 620 is made open to third parties 900 (900a to 900c) via the Internet 800 by a third-party-directed green-degree notification part 680.

In this embodiment, in addition to notifying a customer of the green degree, the green degree of power consumed by the customer can be made open to a third party that is directly related to the economic activities of the customer, for example, a customer of a product yielded by the customer.

In general, the cost of generation of power using a power generation energy source which is friendly to nature and small in environmental load is so high as to hinder the spreading of such power generation energy source. In this embodiment, by utilizing the Internet 800, it is possible to present a customer's attitude toward the prevention of environmental degradation and the exhaustion of resources to another customer of a product yielded by the customer. Such an attitude can be reflected as an increase in the number of products to be purchased by each customer as well as green extra prices, so that it is possible to yield the advantage of maintaining the continuation of the economic activities of the customer. According to this embodiment, it is possible to realize a selection method which enables not only customers but third-party customers to contribute to a reduction in environmental load and the prevention of the exhaustion of resources.

Figure 4:
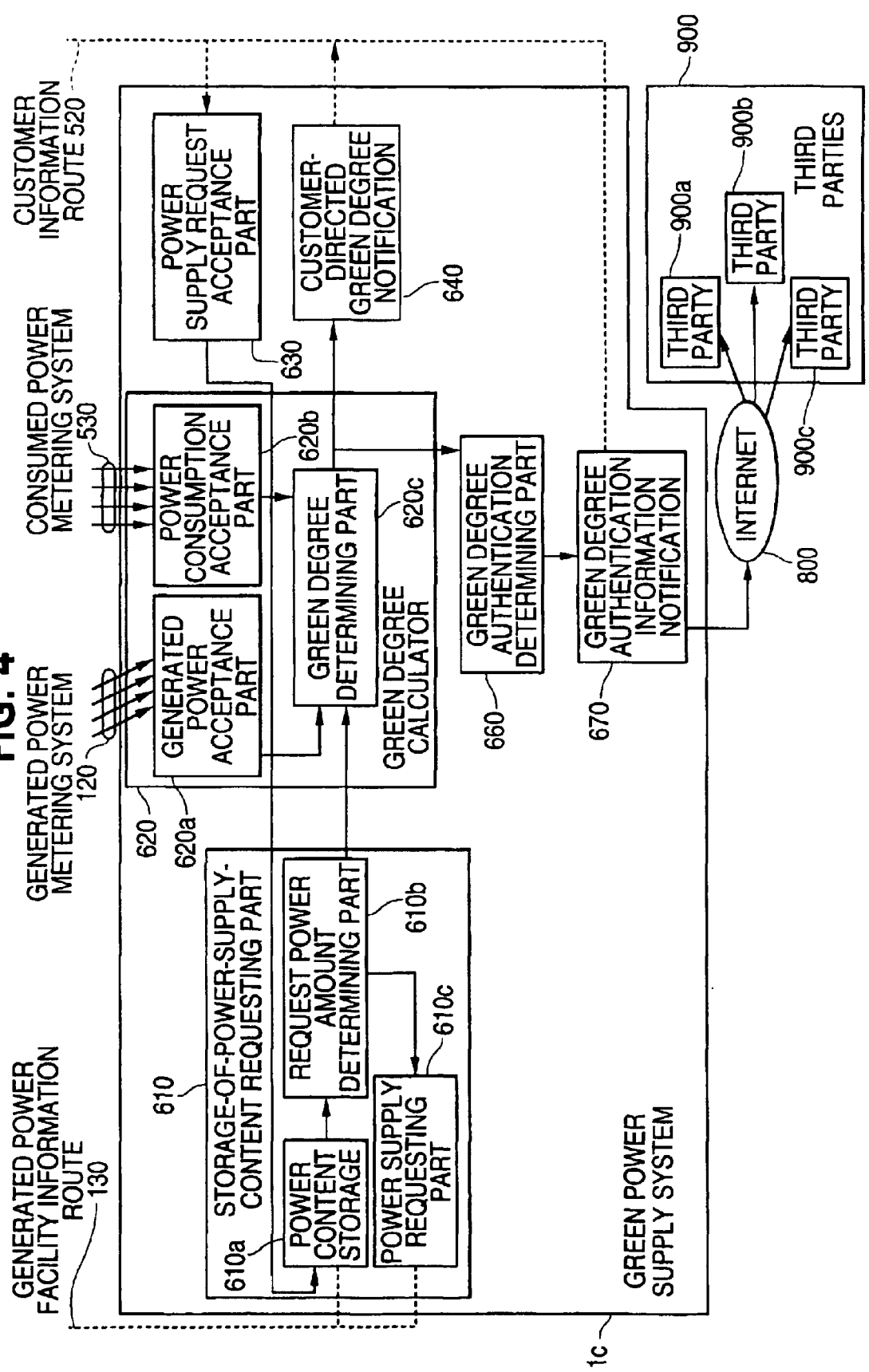
FIG. 4 is an explanatory view of a system, showing still another embodiment of a green power supply system of the present invention.

A green power supply system 1c which is another embodiment of the present invention will be described below with reference to FIG. 4. A green power authentication determining part 660 performs authentication of green power on the basis of the green degree determined by the green degree determining part 620c in the green degree calculation part 620. The result of the authentication is made open to third-parties 900 (900a to 900c) via the Internet 800 and to the customers 500 via the customer information route 520 by a green degree authentication information notification part 670.

In this embodiment, the green power authentication determining part 660 is arranged in the green power supply system 1c, but it may be provided in a third party, for example, a public organization. In this case, this embodiment also includes an arrangement in which a green power authentication application part and a green power authentication acceptance part are provided in the public organization.

The present invention further includes an embodiment provided with a part which transmits to the power generation facilities 100 the green information obtained in the green degree determining part 620c or the green power authentication determining part 660 or a part which makes the green information open to third parties via the Internet. Accordingly, if a power generation facility is provided with an indication representative of the degree of effort which are made at reducing environmental loads and preventing the exhaustion of resources, or if such information made open to third parties, it is possible to establish public relations with local residents and promote coexistence with society.

In addition, in the green power supply system according to the present invention, power generation facilities and customers can perform objective evaluation on the basis of authentication information on the degree of effort at reducing environmental loads and preventing the exhaustion of resources, and can also quantify the effect of such efforts. Accordingly, the power generation facilities and the customers can specifically contribute to activities for creating, enforcing, achieving, reviewing and maintaining the environmental policy of an organization on the basis of the IS014000 series.

In addition, if products are labeled with indications of their green degrees or their green power authentication information, customers that are third parties can select and purchase green products, whereby it is possible to yield the advantage that the customers can contribute to a reduction in environmental load and the prevention of the exhaustion of resources.

Figure 5:
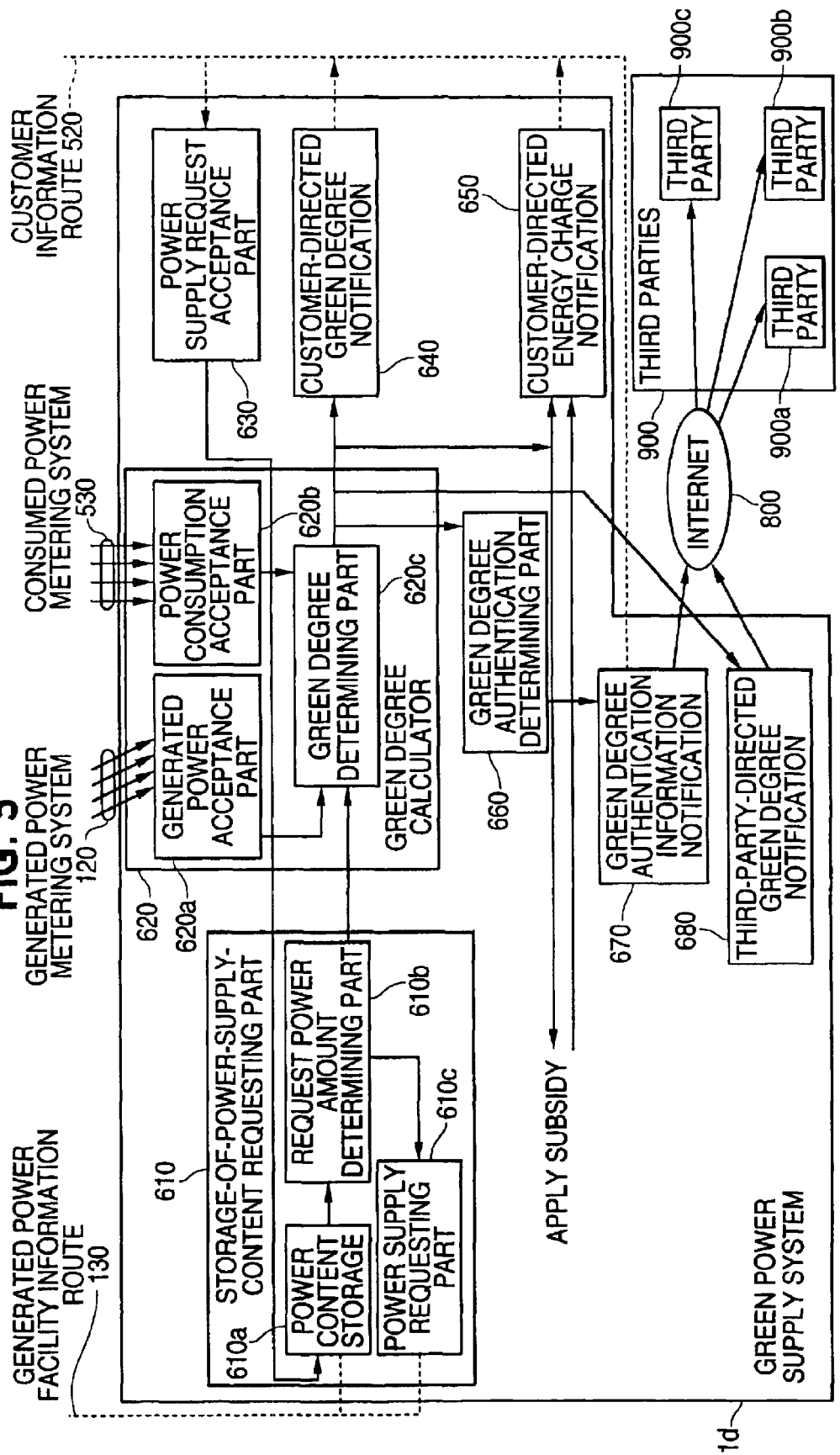
FIG. 5 is an explanatory view of a system, showing yet another embodiment of a green power supply system of the present invention.

A green power supply system 1d which is another embodiment of the present invention will be described below with reference to FIG. 5. The green degree determined by the green degree determining part 620c, information on power generation facilities and customers, and power consumption information are sent to a third-party organization, for example, the government or a local public body, thereby making application for a green power subsidy. In a system which allows partial exemption from taxation, the power supply request acceptance part 630 accepts the information required for tax exemption for each customer, such as the incomes or the contents of tax payment of the customers, and sends the information to the above-described third-party organization. On the basis of subsidy information and customer's power consumption information which are sent from the third-party organ, a customer-directed energy charge notification part 650 determines individual energy charges and notifies the respective customers 500 of the contents of their energy charges via the customer information route 520. In this embodiment, it is possible to provide each of the customers 500 with a direct economic support, i.e., energy charge discount services, whereby it is possible to yield the advantage of accelerating the spreading of the green power supply system. Incidentally, if the present invention is to be realized, it is necessary to stably supply power in terms of frequency, voltage and the rate of occurrence of higher harmonics. For example, the art of the power supply control apparatus described in Japanese Patent Laid-Open No. 308771/1999, which is hereby incorporated by reference, can be used as an art for that purpose. Although the green power supply system according to the present invention does not include a power generation facility, a private power generation facility may be included in the present invention. Moreover, the present invention includes a service providing part which enables purchases and sales of the best mix of the amount of green power required for each season or for each time zone and the green degree and price of the green power by using the Internet for the purposes of communication of information among power generation facilities and customers.

Figure 6:
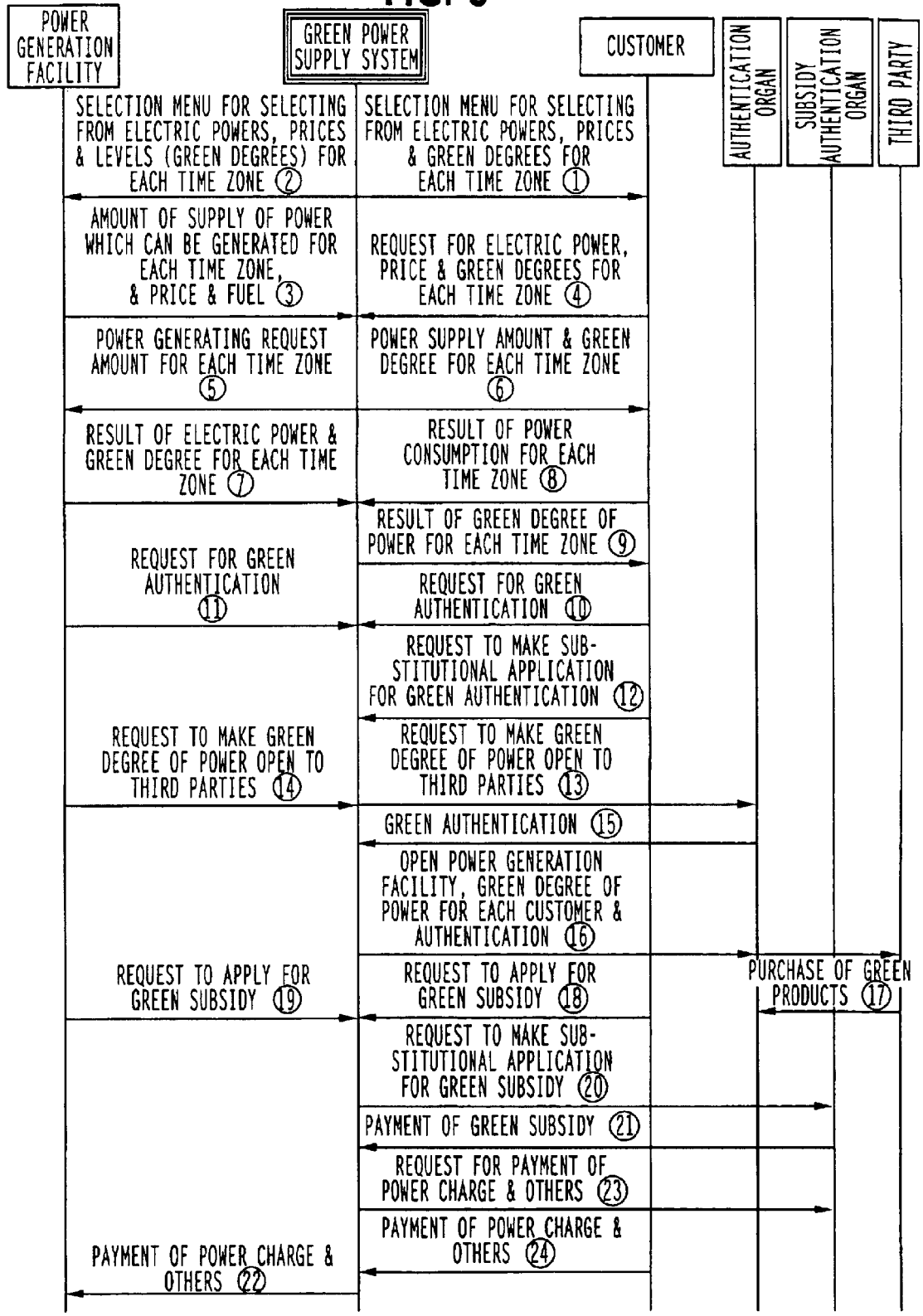
FIG. 6 is an explanatory view of a green power supply system of the present invention, showing the flow of information and a method thereof.

An embodiment of a green power supply method according to the present invention will be described below in detail with reference to FIG. 6. There exist plural power generation facilities having different power generation energies and plural customers that desire power. The powers generated by these power generation facilities pass through transmission lines provided for the respective power generation facilities, and then pass through a transmission and distribution system subsequently, the powers are supplied to the respective power generation facilities through customer's distribution lines, and the electric power for each of the power generation facilities and customer facilities is metered. In this case, in order to realize stable supply of electric power by maintaining the quality of power to prevent malfunctions of electrical appliances or the like due to decreases in voltage or power stoppages, the amount of power to be generated is controlled so that the total amount of supplied power ((the electric power generated by the power generation facilities)−(the power loss in the transmission and distribution system)) per predetermined unit time (e.g., per 30 minutes) can be maintained within a constant proportion (normally, approximately ±2%) in the total amount of electric power consumed by the customers.

In this embodiment as well, stable supply to the customers is the highest priority. The customers desire a supply of power which is small in global environmental load during power generation and has a low price. However, the cost of generating clean power is generally high, and the utilization of energy present in the world of nature involves the disadvantage of unstable supply. The power generation facilities accept from each of the customers at intervals of a predetermined constant time a power supply request inclusive of the proportion of the power consumption per consumption season or time zone to global environmental loads, i.e., the green degree and price of power.

In this case, power supply requests need to be communicated frequently and, furthermore, information such as green degree and charge needs to be bidirectionally communicated approximately in real time, and a huge number of customers are regionally dispersed. Accordingly, as in the case of the communications between each of the power generation facilities and the green power supply system, it is inexpensive and useful to adopt a method which utilizes the Internet. Incidentally, in the case of the utilization of the Internet in particular, it is possible to realize security protection such as the prevention of leakage of information, by a known art which implements a contrivance of an authentication method or installation of a fire wall. In the following description, for the sake of simplicity, reference will not be made to methods which can be realized by such known art, such as a computer activation method and an authentication method to be carried out during the use of the Internet.

In the case of power generation which utilizes natural energy such as wind power or sunlight as its power generation energy, the natural energy exists nearly inexhaustibly on a global scale, but has the disadvantage of finding it impossible to continue stable power generation all the year around at a local level. In addition, different power generation energies have different power generation costs. For these reasons, selection menus in each of which electric powers, prices and green degrees for each time zone are combined are open to power generation facilities and customers (1) (2) (In FIG. 6, (1) and (2); the following numbers similarly correspond to those shown in FIG. 6, respectively).

Figure 7:
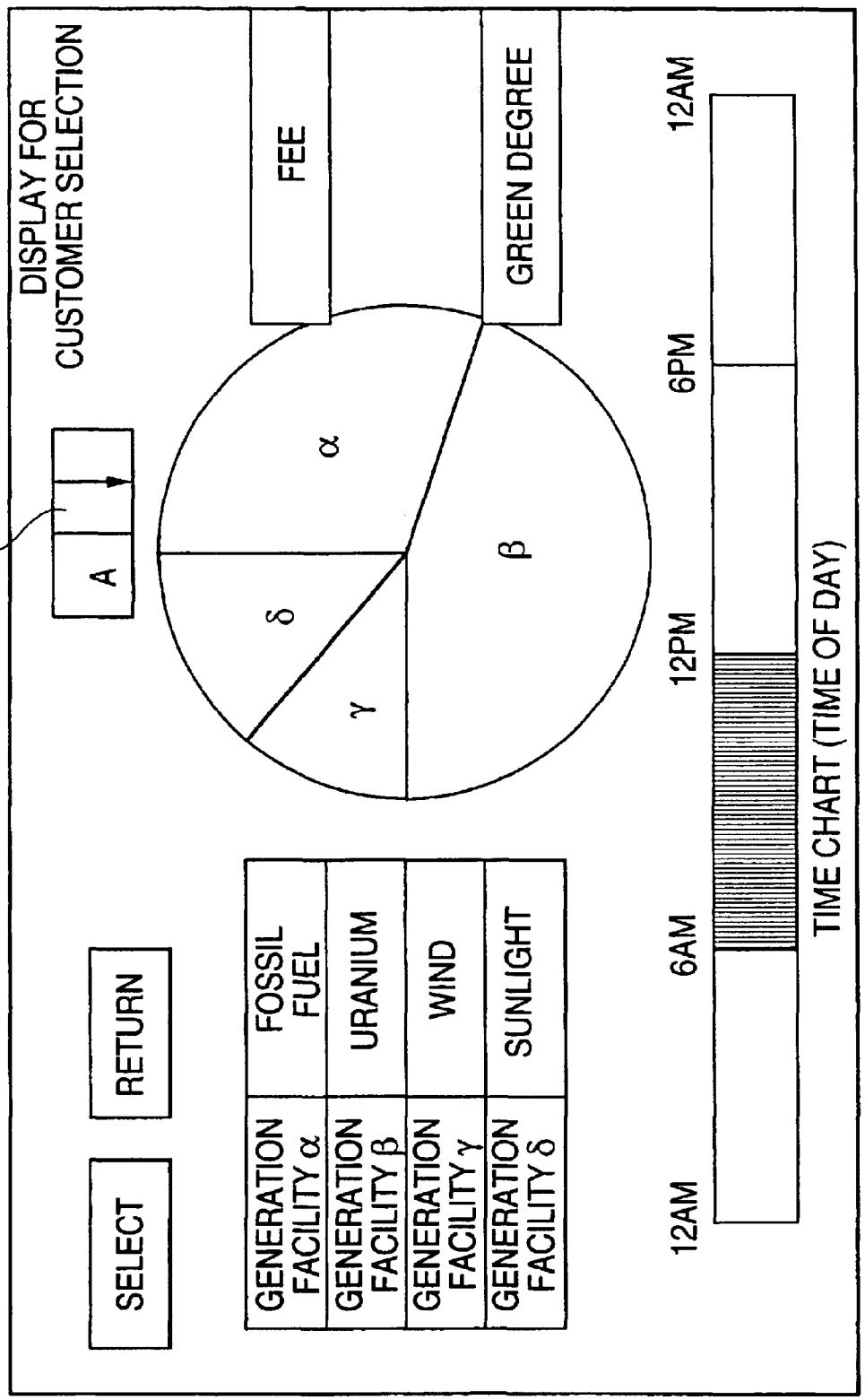
FIG. 7 is a view showing one example of a picture which presents power supply contents from which customers can make a selection.

A method of making the selection menus open on the Internet is suitable as a method of realizing the above-described step. FIG. 7 shows one example of a picture to be presented to the customers. The circular graph shown in the center of FIG. 7 represents the proportion of powers to be generated by the respective power generation facilities tabulated on the left side of the circular graph. The contents of a proposal as to the proportion of powers are changed each time a plan is newly selected. A time zone can be selected from the time chart displayed at the bottom of the picture. A charge estimated on the basis of the proposal and a green degree predicted from this proposal are displayed on the right side of the circular graph.

Power generation information is sent from each of the power generation facilities every season and for every time zone. The power generation information contains the detailed kind of power generation energy which serves as a fuel, for example, the amount of exhaustion of $CO_2$ per unit output, the amount of electric power which can be supplied, an allowable price range, and the name of the power generation facility (3). Similar request information is sent from each of the customers (4).

The green power supply system compares the power supply contents and the power supply request contents nearly in real time and determines at intervals of a predetermined time (for example, 30 minutes) the amount of power to be supplied to power-generation-facility transmission lines so that the difference between the supply and demand of the power is consistently kept in a predetermined range. The green power supply system successively requests power generation from each of the power generation facilities (5). Incidentally, since stable supply of power to the customers is the highest priority, there is a case where a customer cannot always be supplied with power having a green degree desired by the customer. Accordingly, each time the green power supply system determines a request power amount for each of the power generation facilities, the green power supply system notifies a corresponding customer of the green degree and price of power to be supplied to the customer together with the request contents from the customer itself (6).

One example of a procedure for consistently keeping the difference between supply and demand in a predetermined range will be described below. In the following description, for the sake of convenience, the power loss in a transmission and distribution system is considered to be zero.

In the following description, the amount of power generated by each power generation facility and the green degree of the power are defined as $WP_i$ and $BP_i$, respectively, and the power consumption of each customer and its green degree are defined as $WC_j$ and $BC_j$, respectively. In addition, regarding an allowable difference between demand and supply, the rates of the upper and lower limits of the power difference are defined as $(1-W\beta)$ and $(1+W\alpha)$, respectively, and the rates of the upper limit and the lower limit of such green degrees are defined as $(1-B\beta)$ and $(1+B\alpha)$, respectively. Consequently, the total amount of power generated is expressed as the sum of the electric powers generated by the respective power generation facilities, i.e., the total amount of power generated=$\Sigma WP_i$. Similarly, the total amount of power demand is expressed as the total amount of power demand=$\Sigma WC_i$.

In addition, the sum of the products of the electric powers generated by the respective power generation facilities and their green degrees is expressed as the total power generation green amount, $\Sigma WP_i*BP_i$ Similarly, the total power demand green amount can be expressed as $\Sigma WC_i*BC_j$. One example of the procedure will be described below. Incidentally, a procedure for providing allowable price ranges for the respective customer side and power generation facility side is omitted in the following description. The whole of these procedures is sequentially carried out at intervals of approximately 30 minutes.

(1) When Expression (1A) and Expression (1B) are satisfied at the same time, if the electric power and the total green amount are within their respective allowable ranges, the green power supply system requests each of the power generation facilities to generate power by its accepted amount, and each of the customers sends the required amount of electric power and the green degree thereof:

$$1-W\beta \leq (\Sigma WPi)/(\Sigma WCi) \leq 1+W\alpha \quad (1A),$$

$$1-B\beta \leq (\Sigma WPi*BPi)/(\Sigma WCj*BCj) \leq 1+B\alpha \quad (1B).$$

(2) When Expression (1A) and Expression (1C) or Expression (1A) and Expression (1D) are satisfied at the same time, if the electric power is within its allowable range but the total green amount is greater than the upper limit of its allowable range, the green power supply system reviews the request power amount for each of the power generation facilities in terms of the price of power and requests the power generation facilities to generate power according to the result of the review, so that Expression (1B) is satisfied:

$$(\Sigma WPi*BPi)/(\Sigma WCj*BCj) \leq 131\ B\beta \quad (1C),$$

$$1+B\alpha \leq (\Sigma WPi*BPi)/(\Sigma WCj*BPj) \quad (1D).$$

(3) When Expression (2A) is satisfied, the green power supply system regards the stable supply of power as the highest priority, and requests each of the power generation facilities to increase the amount of power generation so that Expression (1A) is satisfied. In this case, the green power supply system makes a selection so that Expression (1B) is satisfied as fully as possible, and sends the resultant electric power and green degree to each of the customers together with the request contents from the customer itself:

$$(\Sigma WPi)/(\Sigma WCj) \leq 1-W\beta \quad (2A).$$

(4) When Expression (3A) is satisfied, the green power supply system requests each of the power generation facilities to decrease the amount of power generation so that Expression (1A) is satisfied as fully as possible. In this case, the green power supply system makes a selection so that Expression (1B) is satisfied as fully as possible, and sends the resultant electric power and green degree to each of the customers together with the request contents from the customer itself:

$$1+W\alpha \leq (\Sigma WPi)/(\Sigma WCj) \quad (3A).$$

On the other hand, the green power supply system successively calculates the green degree of power supplied to each of the customers and that of power to be supplied to the same, on the basis of the result (7) of electric power supplied to the transmission and distribution system by each of the power generation facilities, the result (8) of electric power consumed by each of the customers, the detailed kind of power generation energy for each of the power generation facilities, and customer information. At the same time, the green power supply system notifies the calculated green degrees to each of the customers together with the request contents from the consumer itself (9). Moreover, in accordance with requests (10) (11) from the power generation facilities and the customers, the green power supply system extracts and executes green authentication of particular power generation facilities or customers which have succeeded in yielding remarkable advantages from the point of view of a reduction in environmental load, in terms of the cumulative value of the green degree of each of the power generation facilities and the customers, the green power generation activities of the power generation facilities, the green power consumption activities of the customers, the yielding of products using green power, and the activities of the power generation facilities or the customers at individual stages of recycling of products. It is also suitable to adopt a method of requesting an authentication organization to execute such green authentication on behalf of the green power supply system. The green degrees as well as green authentication information obtained from the granting of the green authentication by the authentication organization (15) are also made open to third parties, inclusive of the power generation facilities and the customers (16), via the Internet in response to the requests of the power generation facilities and the customers (13) (14). In addition, the power generation facilities or the customers label products with the green degrees and the green power authentication information.

Since the resultant green products yielded by such a customer are made open to its customers (16), the customer can present its attitude toward the prevention of environmental degradation and the exhaustion of resources to customers of a product yielded by the customer, whereby the number of products to be purchased by each customer (17) increases and the prices of the products can be increased according to the green degrees thereof. This leads to the advantage that it is possible to realize environmental conservation while maintaining the continuation of the economic activities of the customers. In addition, since customers can selectively purchase green products, they can have the opportunities of contributing to reductions in environmental loads and the prevention of the exhaustion of resources. To promote generation and purchase of green power, subsidies and tax reductions are provided by the government or local public bodies. Since a substitutional service for making application for a subsidy and a substitutional service for making application for a tax reduction are based on approximately the same method, an embodiment will be described below with reference to an example of the substitutional service for making application for a subsidy. In response to the request (18) or (19) of a power generation facility and a customer, the green power supply system makes application to a subsidy providing organization for a subsidy on behalf of the power generation facility or the customer (20), on the basis of the green degree or the green authentication information of the same. Subsequently, the subsidy is paid to the green power supply system (21), and the green power supply system takes into account this subsidy and pays a charge to the power generation facility (22) and requests the customer to pay a charge (23), and the customer pays the charge (24). Accordingly, the green power supply system can yield the advantage of being able to contribute to, a reduction in environmental load and the prevention of the exhaustion of resources while enjoying economic merits in every class of power generation facilities, customers and product consumers. Incidentally, although not shown in FIG. 6, when the green power supply system requests the authentication organization to perform authentication, charging and payment are carried out.

Within the scope of each of the green power supply system and the green power supply method according to the present invention, by completely using the Internet as an information communication part, it is possible to realize a green power market intended for customers such as a large number of unspecified consumers utilizing small amounts of powers as well as world-scale power generation facilities, whereby the present invention can contribute to environmental conservation and the prevention of the exhaustion of resources on a global scale.

Accordingly, it is possible to provide a system and a method each of which is capable of compatibly reducing environmental loads and maintaining the continuation of economic activities.

The invention may be embodied in other specific forms without departing from the spirit or essential characteristic thereof. The present embodiments are therefore to be considered in all respects as illustrative and not restrictive.

We claim:

1. A green power supply system comprising:
    a power supply request acceptance part which accepts from a customer a request for a power generation facility having small environmental loads to supply power to the customer;
    a storage-of-power-supply-content requesting part which stores the state of power supply from each of a plurality of power generation facilities;
    a green degree calculating part which determines the proportion of power which is supplied from the power generation facility having the small environmental loads in response to the request, in power supplied to the customer according to the state of power supply from each power generation facility; and
    a customer-directed green-degree notification part which notifies the customer of the proportion of the power which is supplied from the power generation facility having the small environmental loads, in the power used by the customer.

2. A green power supply system according to claim 1, further comprising a third-party-directed green-degree notification part which notifies a third party of the proportion of the power which is supplied from the power generation facility having the small environmental loads, in the power used by the customer.

3. A green power supply system according to claim 1, further comprising a green power authentication determining part which performs evaluation and authentication of a customers effort at reducing environmental loads and preventing exhaustion of resources, on the basis of the proportion of the power which is supplied from the power generation facility having the small environmental loads, in the power used by the customer, and a green power authentication part which notifies the customer and the third party of green power authentication information determined by the green power authentication determining part.

4. A green power supply system according to claim 1, further comprising a customer-directed power charge notification part which notifies the customer of a power charge which takes into account green subsidy information calculated from the proportion of the power which is supplied from the power generation facility having the small environmental loads, in the power used by the customer.

5. A system connected to customers and power generating facilities, comprising:
    storing means receiving request data from the customers and supplied electric power data from the power generating facilities to the customers and storing the request data, the supplied electric power data and green degrees that are respectively predetermined coefficients for each of the power generating facilities, and
    calculating means producing a calculation result by comparing the request data with the supplied electric power data and the green degree regarding each power generating facility, and outputting the calculation result.

6. The system according to claim 5, wherein the calculating means calculates green degrees assigned to each customer based on the comparison.

7. The system according to claim 5, further comprising:
    informing means transmitting the calculation result to the customer.

8. The system according to claim 5, further comprising:
    transmitting means informing the calculation result to a third party to authorize the calculation result.

9. The system according to claim 8, further comprising:
    distributing means transmitting an authorization to the customer from the third party.

10. The system according to claim 5, further comprising:
    request means transmitting to a power generating facility a request of electric power supplied therefrom based on comparison between supplied electric power and demand of customers.

11. The system according to claim 5, wherein the supplied electric power data from a power generating facility includes a price range.

12. The system according to claim 6, wherein the calculation result includes a price in response to the green degree assigned to a customer.

13. A server connected to customers and power generating facilities, comprising:
    a memory which accepts request data from the customers and supplied electric power data from the power generating facilities and stores the request data, the supplied electric power data, and green degrees that are respectively predetermined coefficients for each of the power generating facilities, and
    a calculating portion which produces a calculation result based on a comparison of the request data with the supplied electric power data and the green degree regarding each of the power generating facilities, and which outputs the calculation result.

14. The system according to claim 13, wherein the calculating portion calculates green degrees assigned to each customer based on the comparison.

15. The server according to claim 13, further comprising:
    an informing portion which transmits the calculation result to the customer.

16. The server according to claim 13, further comprising:
    a transmitting portion which informs the result to a third party to authorize the result.

17. The server according to claim 16, further comprising:
    a distributing portion which transmits an authorization to the customer from the third party.

18. The server according to claim 13, further comprising:
    a request portion which transmits to a power generating facility a request of electric power supplied therefrom based on a comparison between supplied electric power and demand of the customers.

19. The server according to claim 13, wherein the supplied electric power data from a power generating facility includes a price range.

20. The server according to claim 14, wherein the calculation result includes a price in response to the green degree assigned to a customer.

21. A method for indicating a status of supplied electric power to customers from power generating facilities, comprising the steps of:

accepting request data from the customers and supplied electric power data from the power generating facilities;

storing the request data, the supplied electric power data, and a green degree that is a respectively predetermined coefficient for each of the power generating facilities, comparing the request data with the supplied electric power data and the green degree corresponding to each of the power generating facilities;

calculating a green degree of each customer based on the comparison, and outputting a result of calculating the data.

22. The method according to claim 21, wherein the outputting step comprises:

transmitting the calculation result to the customer.

23. The method according to claim 21, wherein the outputting step comprises:

transmitting the calculation result to a third party to authorize the result.

24. The method according to claim 23, further comprising a step of:

distributing an authorization to the customer from the third party.

25. The method according to claim 21, further comprising steps of:

transmitting to a power generating facility a request for electric power supplied therefrom based on a comparison between supplied electric power and demand of customers.

26. The method according to claim 21, wherein the supplied electric power data from a power generating facility includes a price range.

27. The method according to claim 21, wherein the calculation result includes a price in response to the green degree for a customer.

* * * * *